United States Patent
Bryukhov et al.

(10) Patent No.: US 8,478,773 B1
(45) Date of Patent: Jul. 2, 2013

(54) INTERPRETING SEARCH QUERIES

(75) Inventors: Yegor N. Bryukhov, Fort Lee, NJ (US); Vladislav Schogol, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 62 days.

(21) Appl. No.: 13/006,988

(22) Filed: Jan. 14, 2011

(51) Int. Cl.
*G06F 17/30* (2006.01)

(52) U.S. Cl.
USPC ........... 707/765; 707/769; 707/723; 707/736; 705/14.49

(58) Field of Classification Search
USPC .......... 707/769, 759, 723, 736, 748, 999.005, 707/765; 705/14.49
See application file for complete search history.

(56) References Cited

U.S. PATENT DOCUMENTS

| | | | |
|---|---|---|---|
| 2006/0167896 A1* | 7/2006 | Kapur et al. | 707/10 |
| 2006/0212433 A1* | 9/2006 | Stachowiak et al. | 707/3 |
| 2008/0120276 A1* | 5/2008 | Chennavasin | 707/3 |
| 2008/0301112 A1* | 12/2008 | Wu | 707/5 |
| 2009/0019028 A1* | 1/2009 | Norris et al. | 707/5 |
| 2009/0292686 A1* | 11/2009 | Carter et al. | 707/5 |
| 2010/0138293 A1* | 6/2010 | Ramer et al. | 705/14.46 |
| 2010/0146012 A1* | 6/2010 | Beaudreau et al. | 707/803 |
| 2011/0258049 A1* | 10/2011 | Ramer et al. | 705/14.66 |
| 2012/0130972 A1* | 5/2012 | Ahn et al. | 707/706 |

* cited by examiner

*Primary Examiner* — Dennis Truong
(74) *Attorney, Agent, or Firm* — Bracewell & Guiliani, LLP

(57) ABSTRACT

Methods, systems, and apparatus, including computer programs encoded on a computer storage medium, for interpreting search queries. In one aspect, a method includes receiving a search query. The method also selects a disambiguated interpretation of the search query based on analysis of stored search queries and analysis of stored responses of users having a similar characteristic as the user that initiated the search query. The method also provides a set of the search results. The set is selected based on the disambiguated interpretation of the search query.

22 Claims, 3 Drawing Sheets

INTERPRETING SEARCH QUERIES

BACKGROUND

This document relates to interpreting search queries.

The Internet provides access to a wide variety of resources, including video or audio files, web pages for particular topics, maps, address information, directions and news articles. A search system can identify resources in response to a text query that includes one or more search terms or phrases. The search system typically ranks the resources based on their relevance to the query and on measures of quality of the resources and provides search results that link to the identified resources. The search results are typically ordered for viewing according to the rank.

Some search systems can be used in conjunction with an online map. For example, some search systems can receive search queries for an address or a location and display the search results on an online map. The online map can display the geographical information associated with the search results in varying levels of granularity that range, for example, from street-level to state-level to country-level. In some cases, the online map can display the geographical information associated with the search result on a continental map or world map.

SUMMARY

This specification describes technologies relating to interpreting search queries.

In general, one innovative aspect of the subject matter described in this specification can be embodied in methods that receives a search query. The method also selects a disambiguated interpretation of the search query based on analysis of stored search queries and analysis of stored responses of users having a similar characteristic as the user that initiated the search query. The method also provides a set of the search results. The set is selected based on the disambiguated interpretation of the search query. Other embodiments of this aspect include corresponding systems, apparatus, and computer programs, configured to perform the actions of the methods, encoded on computer storage devices.

These and other embodiments can each optionally include one or more of the following features. The stored search queries can include less ambiguous search queries that include at least a portion of the search query. The less ambiguous search queries can include at least one of search queries having a greater number of search terms than the search query or search queries having geographic information. The stored responses can include at least one of a refined search query received in response to a previously presented search result, wherein the previously presented search result was in response to a stored search query, or a user interaction with the previously presented search result. The user interaction with the previously presented search result can include at least one of a user click or a mouse over. The similar characteristic can include a geographic location from which the search query originated. The search query can include a query for a search result in a particular location. The set of search results can include search results that are responsive to the disambiguated interpretation of the search query.

Particular embodiments of the subject matter described in this specification can be implemented so as to realize one or more of the following advantages. Search queries that are ambiguous or under-specified can be interpreted and a search result likely matching the user's intended search query can be provided. Additionally, ambiguous search queries that typically yield search results located in geographically distant locations can be resolved such that intended search results can be displayed on an online map having high granularity of detail (e.g, a town or neighborhood of a city). In addition, by determining the user's intended search query, the number of irrelevant search results can be reduced and different types of user interfaces can be provided to a user based on the search results likely matching the user's intended search query. For example, if the search results likely matching the user's intended search query are hotels, a user interface that includes reservation information and price information can be provided, but if the search results include hotels and restaurants, the user interface that includes reservation information and price information would not be displayed to the user.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

In general, in some embodiments of the techniques described in this specification, a search system receives a search query from a user device. The search query is analyzed to determine whether the search query is ambiguous or is underspecified. The search system can determine the user's intended search query by analyzing previously received search queries that are similar to the search query and by analyzing geographical information associated with the user device. The search system can also determine the user's intended search query by analyzing stored user responses associated with the previously received search queries. After the search query is disambiguated, the search system filters the set of search results and provides the search results that are relevant to the disambiguated search query.

The systems discussed here may provide one or more mechanisms for collecting information about users. Users may be provided with an opportunity to opt in/out of programs that may collect personalized information. In addition, certain data may be anonymized in one or more ways before it is stored or used, so that personal data is removed. Data can also be aggregated or filtered to remove some or all personal data.

Figure 1:
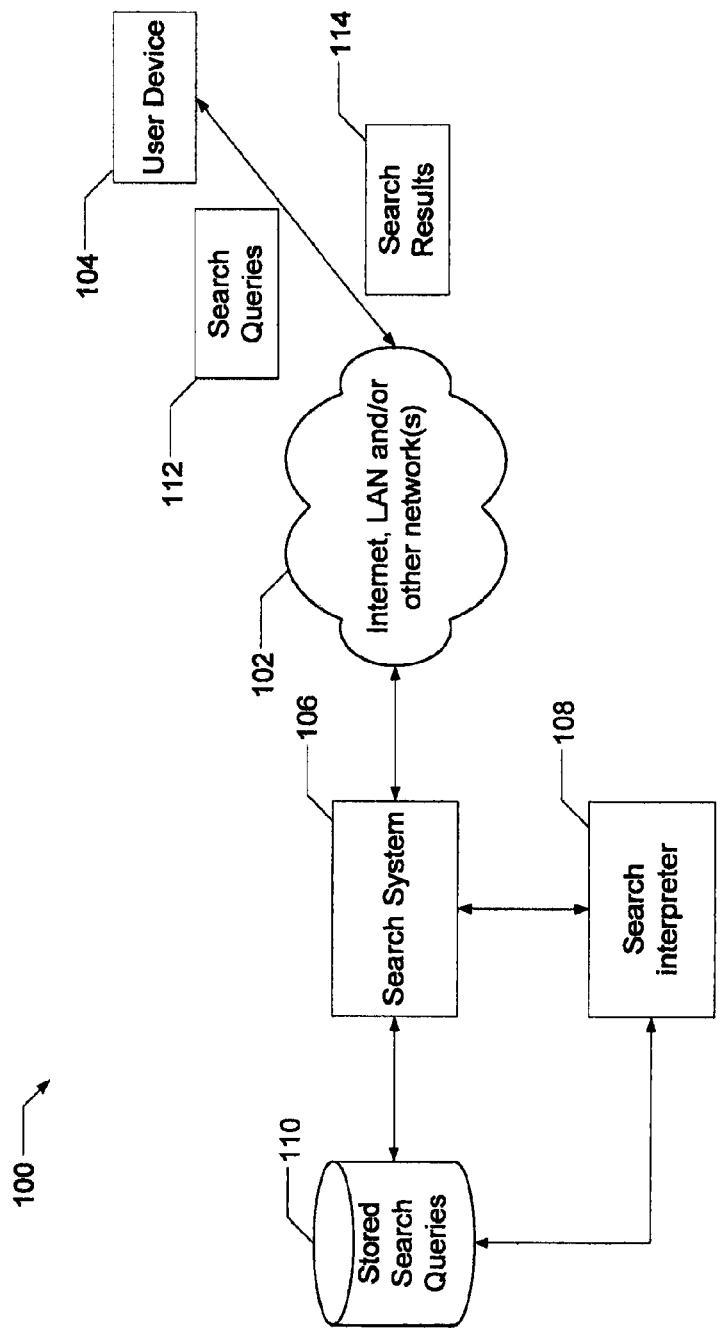
FIG. 1 is a block diagram of an example environment in which a search system interprets search queries.

FIG. 1 is a block diagram of an example environment 100 in which a search system interprets search queries. The example environment 100 includes a network 102, a user device 104, a search system 106, a search interpreter 108, and a database of stored search queries 110. Although FIG. 1 illustrates a single user device 102, multiple user devices 102 can be included in the environment 100.

The network 102 can be any type of network such as a local area network (LAN), wide area network (WAN), the Internet, or a combination thereof. The network 102 facilitates connectivity between the user device 104, the search system 106 and the search interpreter 108.

The user device 104 can be any type of device capable of accessing the network 102. For example, the user device 104 can be a computer, a laptop, a tablet computer or a smart phone. The user device 104 can be used to transmit search queries 112 to the search system 106 and receive search results 114 from the search system 106. The user device 104 can display the search results 114 and allow a user to interact with the search results 114. For example, a user can click on a search result, perform another search query that refines a previous search query, mouse over a search result, etc. The user device 104 can monitor the user responses to the search results 114 and provide the user responses to the search system 106. Various technologies to monitor the user responses can be used, e.g., using cookies to store and provide data regarding prior searches or selections, tracking user interactions throughout a search session, or using scripts to report user actions to a server. In some implementations, the user device 104 can display the search results on an online map.

The search queries 112 can be queries for destinations (i.e., a geographical search query). For example, a geographical search query can be a query for a particular location(s)/destination(s) (e.g., a specific restaurant(s), a specific store(s), a specific park, and/or an address), or a query for location(s)/destination(s) in a particular geographic area (e.g., a neighborhood, town, county, etc.). In some implementations, the geographical search query is generated in connection with an online mapping utility.

In some cases, the search queries 112 can be ambiguous. An ambiguous search query 112 can have a value that potentially produces one or more unrelated or otherwise diverse search results (e.g., search results that are geographically diverse or having divergent category associations). For example, a search query 112 can have a value equal to "Lahore," which can correspond to either a restaurant in San Francisco, Calif. or a city in Pakistan. An ambiguous search query can be ambiguous because it does not include additional terms or details that would disambiguate the search query (e.g., an underspecified search query). For example, search queries such as "Lahore, Pakistan" or "Lahore restaurant San Francisco" would disambiguate the search query "Lahore" because the user's intended search is discernible from the contents of the search query 112.

In some implementations, the search query 112 can include information associated with the location of the user device 106. For example, an IP address and geographical data associated with the IP address can be transmitted with the search query 112. In addition, a user may choose to include geographical information in the search query 112. For example, the user can choose to provide GPS coordinates or other location identifying information associated with the user and/or the user device 104 (e.g., cellular tower information associated with the user device 104).

In some implementations, the search query can include information associated with an online map or other resource that is being displayed on the user device 106. For example, if the user device 106 is displaying a map of mid-town Manhattan, the search query can include information identifying mid-town Manhattan as the location from which the search query originated.

The search system 106 includes a plurality of servers located in various geographical locations and is configured to receive search queries 112 from the user device 104 and to return search results 114 to the user device 104. The search system 106 can access indexes storing data related to the resources and/or databases that include data associated with the resources (e.g., address information, business category information, etc.) and identify the resources that are predicted to be relevant to the search query 112. Various algorithms can be used to determine the relevance score. In addition, each of the search results can include information describing the search result 114, such as address information, phone number, and/or categorical information (e.g., grocery store, restaurant, theater, city, place of interest, etc.). In some implementations, the search results 114 are ordered such that the first search result is the most relevant search result and the second search result is determined to be the second most relevant search result.

The search system 106 can also receive information associated a user's response(s) to the set of search results 114. For example, the search system 106 can receive information associated with the particular search results a user clicked on or otherwise interacted with (e.g., a mouse over). In some implementations, the search system 106 can receive information such as a refined search query performed by a user in response to previously presented search results. For example, a user can receive a set of search results that are responsive to a first search query, inspect the search results and provide a refined search query that includes further details related to the first search query, e.g., additional terms related to the query or geographical information. The search system 106 can receive the refined search query and the user's response to the resulting search results.

The search system 106 can store the search queries 112 in a database of stored search queries 110. The database 110 can be any type of database and/or memory that can store the search queries 112. The search system 106 can also store the user responses associated with stored search queries 112 in the database of stored user responses 110.

The search system 106 can provide the search query 112 and the search results 114 to the search interpreter 108 to determine whether the search query 112 is ambiguous. The search interpreter 108 can analyze the address information associated with each of the search results 114 and determine whether the search results 114 are located in geographic areas that are separated by a large distance. For example, the search interpreter 108 can determine that the first search result is located in Sydney, Australia and the second search result is located in South America. In addition, the search interpreter 108 can compare the distance between two search results to a predetermined threshold (e.g., 100 miles) to determine whether the search query 112 is ambiguous. In some implementations, the search interpreter 108 can determine that the search query 112 is ambiguous by analyzing the categorical information associated with the set of search results. For example, if the first search result is associated with the restaurant category and the second search result is associated with the city category, then the search interpreter 108 can determine that the search query is ambiguous. In some implementations, the search interpreter 108 analyzes the address and/or categorical information associated with several of the search results to determine whether the search query 112 is ambiguous.

In addition, the search interpreter 108 can access the database of stored search queries 110 and identify prior search queries that are similar to the search query 112 (i.e., "set of similar search queries"). A prior search query can be similar to the search query 112 if it includes all or part of the search query 112. For example, the search interpreter 108 can receive a search query 112 that is equal to "Coles" and determine that prior search queries that include Coles as a prefix (e.g. "Coles, Sydney") and/or Coles as a suffix (e.g., "Sydney, Coles") are similar to the search query 112. In addition, the search interpreter 108 can determine a previous search query is similar to the search query 112 if the search query is a subset of the previous search query and/or a substring of the previous search query. For example, "Disney park" is a subset of the phrase "Disney World Theme Park" and "Disney World" is a substring of "Disney World Theme Park." In some implementations, while identifying the prior search queries that are similar to the search query 112, the search system 106 can correct or make adjustments for spelling errors in either the search query 112 and/or the previous search queries. In addition, the search interpreter 108 can change the stem of each word in either the search query 112 and/or previous search queries. The search interpreter 108 can include these modified search queries in the set of similar search queries.

In addition, search interpreter 108 can reduce the set of similar search queries to include only the previous search queries that originated in the same location as the search query 112. For example, if the search query 112 includes geographical information indicating the user device 104 is located in San Francisco, Calif., the search interpreter 108 can limit the set of similar search queries to include only similar search queries that originated in San Francisco or within a predetermined distance away from San Francisco (e.g., within a 25 mile radius).

The search interpreter 108 can disambiguate the ambiguous or under-specified search query 112. For example, the search interpreter 108 can analyze the set of similar search queries and generate histogram data based on the set of similar search queries. The generation of histograms can be performed offline, rather than in real time, although real time analysis of at least some information associated with stored user responses is possible. In some implementations, the search interpreter 108 collects and processes the information represented by the histogram (e.g., frequencies of search queries or a number of search queries over a particular time period) but does not generate a graph.

Figure 3:
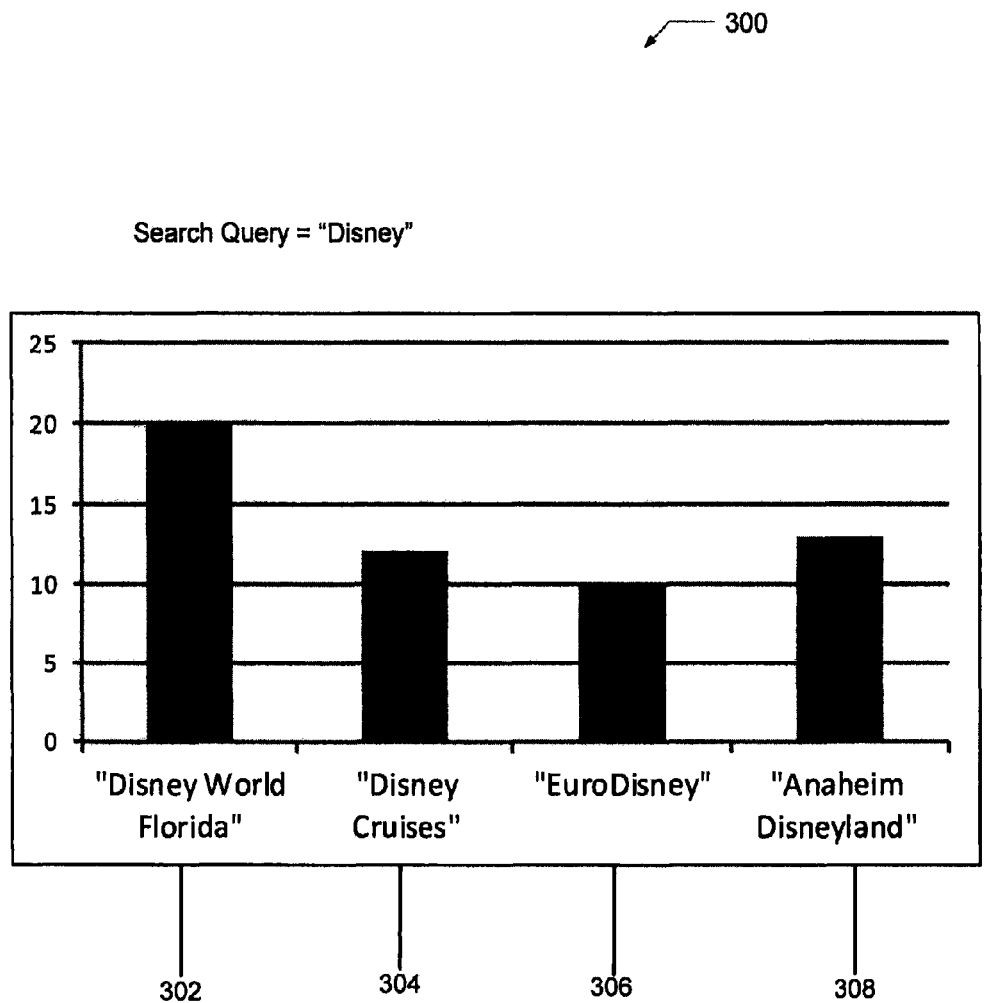
FIG. 3 illustrates an example histogram of similar search queries.

FIG. 3 illustrates an example histogram of similar search queries 300. In the example of FIG. 3, the search query is equal to "Disney" and the histogram 300 includes groupings for search queries originating from the same location as the search query "Disney" (e.g., Cleveland, Ohio). Grouping 302 represents the number of search queries for "Disney World Florida." Grouping 304 represents the number of search queries for "Disney Cruises." Grouping 306 represents the number of search queries for "EuroDisney." Grouping 308 represents the number of search queries for "Anaheim Disneyland." For example, grouping 302 includes twenty search queries having the form "Disney World Florida." Each grouping is associated with a search query count that represents the number of search queries in each grouping.

The search interpreter 108 can use the histogram data to determine the user's intended search query by determining which grouping includes the largest number of search queries. The search interpreter 108 can identify the grouping with the greatest number of search queries as the intended search query and return search results that are relevant to that grouping. For example, referring to FIG. 3, the search interpreter 108 can determine that grouping 302a is the disambiguated search query because it contains the largest number of search queries and return search results relevant to the search query "Disney World Florida."

Although the search interpreter 108 determined that the search query "Disney" should be interpreted to be "Disney World Florida," if the search query "Disney" originated in location other than Cleveland, the search interpreter 108 could return a different result because the set of similar search queries could be different. For example, if the search query "Disney" originated from Los Angeles, Calif., the set of similar search queries could be different from those illustrated in FIG. 3 and the search interpreter 108 could interpret the search query to be another search query, such as "Disneyland."

In some implementations, the search interpreter 108 can analyze the stored user responses associated with the prior search queries in each of the groupings to interpret the ambiguous search query. For example, the search interpreter 108 can analyze the user responses associated with each search query in a grouping and determine whether the user responses provide an indication that the user was satisfied with the search results. For example, if a user clicked on one of the previous search results and did not return to the set of search results, the search interpreter 108 can determine that the user was satisfied with the search result. An example user response that indicates the user is not satisfied with the search results includes situations where the user clicks on a search result, returns to the search result page and then clicks on a second search result. A second example user response that can indicate user dissatisfaction is if the user performs a refined search query after receiving the set of search results. The search interpreter 108 can identify the grouping with the largest number of search queries that has no indications that the users were not satisfied with the search results as the user's intended search query (i.e., the disambiguated search query). Typically, this analysis is performed offline, rather than in real time, although real time analysis of at least some information associated with stored user responses is possible.

In some implementations, the search interpreter 108 uses the histogram analysis in combination with other information to determine the user's intended search query. For example, the search interpreter 108 can use the histogram analysis in combination with user activity (e.g., the user's earlier search queries transmitted during the same session) to determine the user's intended search query. In some implementations, the histogram analysis can be used in combination with search metrics, such as the number of relevant websites/references. For example, if the histogram analysis indicates that a first interpretation is the intended search query and this first interpretation is only slightly better than a second interpretation that has a large number of relevant web sites/references associated with it, the search interpreter 108 can ignore the histogram analysis and choose the second interpretation because of the number of relevant web sites/references.

Figure 2:
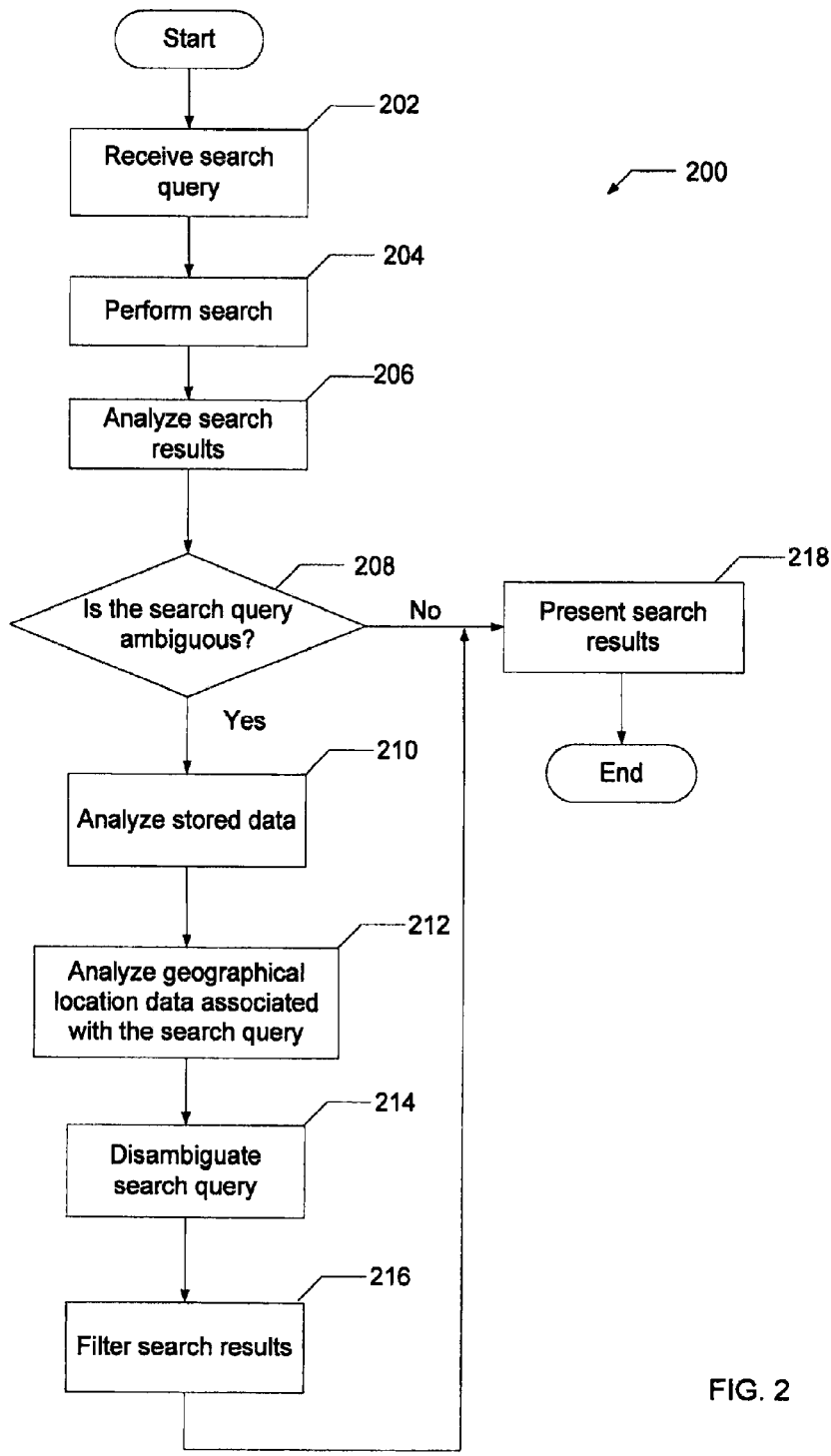
FIG. 2 is a flowchart of an example process for interpreting search results.

FIG. 2 is a flowchart of an example process 200 for interpreting search queries. The process 200 begins by receiving a search query 112 (at 202). For example, a search query 112 can be transmitted from the user device 104 to the search system 106. The search query 112 can be a search query for a particular location(s)/destination(s) (e.g., a specific restaurant(s), a specific store(s), a specific park, and/or an address), or a search query for location(s)/destination(s) in a particular geographic area (e.g., a neighborhood, town, county, etc.).

At 204, a search is performed based on the search query 112. For example, the search system 106 can access indexes representing resources and/or databases that store data related to the resources. In some implementations, the search results are ordered such that the first search result is the most relevant search result and the second search result is determined to the second most relevant search result. Each search result can include information describing the search result, such as address information, phone number, and/or categorical information (e.g., grocery store, restaurant, theater, city, place of interest, etc.). The search system 106 can provide the search query and the search results to the search interpreter 108.

At 206, the search results are analyzed to determine whether the search query 112 is ambiguous. For example, the search interpreter 108 can analyze the address information associated with the first search result and the second search result (i.e., the two most relevant search results) and determine whether the distance between the two addresses is greater than a predetermined threshold. If the distance is greater than the predetermined threshold, the search system 106 determines that the search results are not located in the same geographic area/region and that the search query 112 is ambiguous. In some implementations, the search interpreter 108 can analyze the other information associated with the search results, such as the business category information, and determine whether the search query is ambiguous. For example, the search interpreter 108 can compare the category information associated with two search results. If the business category information associated with the two search results are not similar or identical, then the search system 106 can determine that the search query 112 is ambiguous. In some implementations, the search interpreter 108 can analyze address information and/or category information associated with all of the search results to determine whether the search query is ambiguous. Although FIG. 2 illustrates a particular set of steps to interpret search queries, the order of these steps can be modified. In some implementations, the ambiguity of the search query can be determined before or in parallel with retrieving the set of search results. For example, ambiguous search queries can be identified in memory based on an offline analysis of stored search queries and user responses before the search query and the search results are provided to the search interpreter 108. As a result, the disambiguity of the search query can be incorporated into the generation of search results at 204.

If the search query 112 is not ambiguous (at 208), the search results are returned (at 218). For example, if the search system 106 determined that the search query 112 is not ambiguous, the search system 106 can provide the set of search results 114 to the user device 106. The user device 106 can display the search results 114 to the user. In some implementations, the user device 106 presents the search results on an online and/or interactive map.

If the search query 112 is ambiguous (at 208), the database of stored search queries 110 is analyzed to identify previous search queries that are similar to the search query 112 (at 210). For example, the search interpreter 108 can analyze the database 110 and identify the set of similar search queries. In some implementations, the set of similar search queries includes previous search queries that include all or part of the search query 112.

After the set of similar search queries is identified, the geographical information associated with the search query 112 is analyzed (at 212). For example, the search interpreter 108 can analyze the geographical information associated with the search query 112 and determine the location of the user device 106 at the time the search query 112 was sent, a default location (e.g., home location) of a user associated with the user device 106, or a geographical area associated with recent searches or other web activity on the user device 106 (e.g., a location being displayed on an online map). The search interpreter 108 can filter the set of similar search queries to include only the previous search queries that originated from the same geographic region as the search query 112 (or that were otherwise interpreted as being associated with the same geographic region as the current query). For example, the search interpreter 108 can limit the set of similar search queries to include only previous search queries that originated in the same city and/or nearby cities as the search query 112 and/or within a predetermined distance from the user device 106.

After the set of similar search queries are filtered (at 212), the search query 112 is disambiguated (at 214). For example, the search interpreter 108 can analyze the set of similar search queries and generate histogram data based on the set of similar search queries. For example, the grouping of the histograms can be based the previous search queries. The search interpreter 108 can identify the grouping with the largest number of search queries and identify the grouping as the disambiguated search query. In some implementations, the search interpreter 108 generates the histogram data offline. In some implementations, the data represented by the histogram is generated but is not graphed.

In some implementations, the search interpreter 108 can analyze the stored user responses that are associated with the previous search queries included in the groupings and determine whether the user responses provide an indication that the user was dissatisfied with the search results. For example, the histogram data can include a search query count for each grouping and include a count of users that were not satisfied with the search results associated with each grouping (i.e., "a dissatisfaction count") In some implementations, each type of user response that indicates that the user was dissatisfied with the search results can be counted differently. For example, a refined search query can be equal to a full count (e.g., 1) but a mouse over a search result followed by a click on a different search result can be equal to a half count (e.g., 0.5). In some implementations, the dissatisfaction count can include subcounts that reflect the different types of user responses associated with the grouping (e.g., failure of a user to select any of the search results, user exploration of numerous presented search results without spending significant time on any of the search results, receipt of a refined search query after the user is presented with the search results, or determining that the user scrolled through multiple pages of presented search results). Various counting methods can be used. The search interpreter 108 can identify the grouping with the largest search query count and that does not include a significant dissatisfaction count as the disambiguated search query. In some implementations, the search interpreter 108 can identify the grouping with a score indicative of a combined largest search query count and the lowest dissatisfaction count penalty (e.g., where search query count is given a positive score and the dissatisfaction count is given a negative score) as the disambiguated search query. In some implementations, the search interpreter 108 can examine the subcounts associated with the dissatisfaction count and select, for example, the grouping that includes the highest combined score with positive scores assigned to the search query count and negative scores assigned to search queries that are followed by refined search queries. Other techniques for evaluating search query counts and dissatisfaction counts can also be used.

After the search query 112 is disambiguated (at 214), the set of search results is filtered to remove search results that are not relevant to the disambiguated search query. For example, the search interpreter 108 can remove search results that are not relevant to the grouping that was identified to be the disambiguated search query. The filtered search results are then provided to the user device 106 (at 218). For example, the search interpreter 108 and/or the search system 106 can provide the filtered search results to the user device 106, which can then display the search results on an interactive/online map.

An example use case is described below. The example use case is merely for illustrative purposes and is not meant to limit the scope of the claims or disclosure.

A user device 104, located in Sydney, Australia, can transmit a search query 112 equal to "Coles" to the search system 106. In response, the search system 106 can perform a search for "Coles" and provide the search results to the search interpreter 108. The search interpreter 108 can analyze the search results and determine that the search query "Coles" is ambiguous because some of the search results are located in Sydney, Australia and some of the search results are located approximately 800 miles from Sydney. The search interpreter 108 can also determine that the search query is ambiguous because the category information associated with the some of the search results are related to a business and others are related to a city. The search interpreter 108 can then analyze the database of stored search queries 110 to identify previous search queries that are similar to "Coles." For example, the set of similar search queries can include search queries such as "Coles County Illinois," "Coles Group," "Coles Bookstore," "Coles Supermarkets," "Coles Groceries," "Coles, SA" and "Coles Australia." The search interpreter 108 can filter the set of similar search queries to include only the similar search queries that originated in or within a 25 mile radius of the user device 102 (i.e., Sydney, Australia). The search interpreter 108 can create a histogram based on the set of similar search queries, which in some cases can include the stored user responses associated with the set of similar search queries to disambiguate the search query. If histogram grouping associated with "Coles Supermarket" is the largest grouping, the search interpreter 108 can select "Coles Supermarket" as the disambiguated search query. The search interpreter 108 can then provide the search results responsive "Coles Supermarket" to the user device 102. If the user device 102 had been located in South Australia, the histogram data could have revealed a strong tendency that the search query should be interpreted to be "Coles, SA."

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, in some implementations, the search interpreter 108 can generate histogram data based on the set of similar search queries such that the groupings of the histogram are based on the categorical information associated with the search queries. For example, a histogram can include groupings for search queries associated with grocery stores, restaurants, places of interest, etc. The search queries can be filtered based on the location from which the search query originated, as described above. The search interpreter 108 can disambiguate the set of similar search queries by identifying the grouping with the largest number of search queries as the user's intended search query and filter the search results to include only search queries associated with the categorical information.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a search query from a user;
   identifying a plurality of search results responsive to the search query;
   determining that the search query is ambiguous by determining that the geographic distance between locations associated with at least two of the search results is greater than a predetermined distance;
   selecting a disambiguated interpretation of the search query based on analysis of a log of stored search queries that are similar to the search query and that have been received from a plurality of other users; and
   providing a set of search results, wherein the set is selected based on the disambiguated interpretation of the search query.

2. The computer-implemented method of claim 1 wherein determining that the search query is ambiguous further comprises determining that at least two of the search results responsive to the search query are associated with different categories.

3. The computer-implemented method of claim 1 further comprising determining that the stored search queries are similar to the search query by determining that the stored search queries include at least a portion of the search query.

4. The computer-implemented method of claim 3 further comprising determining that the stored search queries have a greater number of search terms than the search query or contain geographic information.

5. The computer-implemented method of claim 1 wherein the analysis of the log of stored search queries that are similar to the search query includes identification of at least one of a refined search query received in response to a previously presented search result responsive to the search query, or a user interaction with the previously presented search result.

6. The computer implemented method of claim 5 wherein the user interaction with the previously presented search result includes at least one of a user click or a mouse over.

7. The computer-implemented method of claim 1 wherein the log of stored search queries are determined to be similar to the search query based on similar characteristics that include a geographic location from which the search query originated.

8. The computer-implemented method of claim 1 wherein analysis of the log of stored search queries that are similar to the search query includes:
   identifying a set of stored search queries that are associated with a geographic location from which the search query originated; and
   analyzing histogram data associated with the set of stored queries.

9. The computer-implemented method of claim 1 wherein the analysis of the log of stored search queries that are similar to the search query includes
   determining user satisfaction associated with search results previous presented in response to the stored search queries.

10. The computer-implemented method of claim 1 wherein the search query includes a query for a search result in a particular location.

11. The computer-implemented method of claim 1 wherein the set of search results includes search results that are responsive to the disambiguated interpretation of the search query.

12. A system, comprising:
   a database storing a log of stored search queries; and
   one or more computers having a search query interpreter coupled to the database and configured to receive a search query from a user, identify a plurality of search results responsive to the search query, determine that the search query is ambiguous by determining that the geographic distance between locations associated with at least two of the search results is greater than a predetermined distance, select a disambiguated interpretation of the search query based on analysis of the log of stored search queries that are similar to the search query and that have been received from a plurality of other users, and provide a set of search results, wherein the set is selected based on the disambiguated interpretation of the search query.

13. The system of claim 12 wherein the search query interpreter is further configured to determine that the search query is ambiguous by determining that at least two of the search results responsive to the search query are associated with different categories.

14. The system of claim 12 wherein the search query interpreter is further configured to determine that the stored search queries are similar to the search query by determining that the stored search queries include at least a portion of the search query.

15. The system of claim 14 wherein the search query interpreter is further configured to determine that the stored search queries have a greater number of search terms than the search query or contain geographic information.

16. The system of claim 12 wherein the analysis of the log of stored search queries that are similar to the search query includes identification of at least one of a refined search query received in response to a previously presented search result responsive to the search query, or a user interaction with the previously presented search result.

17. The system of claim 12 wherein the search query interpreter is further configured to determine that the log of stored search queries are similar to the search query based on a geographic location from which the search query originated.

18. The system of claim 12 wherein the search query interpreter is configured to analyze the log of stored search queries that are similar to the search query by:
   identifying a set of stored search queries that are associated with a geographic location from which the search query originated; and
   analyzing histogram data associated with the set of stored queries by analyzing histogram data associated with user responses to previously received queries that are related to the search query.

19. A tangible, non-transitory computer readable medium encoded with a computer program comprising instructions that, when executed, operate to cause a computer to:
   receive a search query from a user;
   identify a plurality of search results responsive to the search query;
   determine that the search query is ambiguous by determining that the distance between locations associated with at least two of the search results is greater than a predetermined geographic distance;
   select a disambiguated interpretation of the search query based on analysis of a log of stored search queries that are similar to the search query and that have been received from a plurality of other users; and
   provide a set of search results, wherein the set is selected based on the disambiguated interpretation of the search query.

20. The computer readable medium of claim 19 wherein the instruction to determine that the search query is ambiguous further comprise instructions to determine that at least two of the search results responsive to the search query are associated with different categories.

21. The computer readable medium of claim 19 wherein the computer program further includes instructions that when executed cause the computer to:
   analyze the log of stored search queries by identifying a set of stored search queries that are associated with a geographic location from which the search query originated; and
   analyze histogram data associated with the set of stored queries.

22. The computer readable medium of claim 19 wherein the computer program further includes instructions that when executed cause the computer to:
   analyze the stored search queries by:
      identifying a set of stored search queries that are associated with a geographic location from which the search query originated; and
      analyzing histogram data associated with the set of stored queries analyzing histogram data associated with user responses to previously received queries that are related to the search query.

* * * * *